(12) United States Patent
Cho et al.

(10) Patent No.: US 8,472,733 B2
(45) Date of Patent: *Jun. 25, 2013

(54) METHOD AND APPARATUS FOR ENCODING AND DECODING IMAGE

(75) Inventors: Dae-Sung Cho, Seoul (KR); Woo-Shik Kim, Yongin-si (KR); Dmitri Birinov, Yongin-si (KR); Hyun-Mun Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/544,307

(22) Filed: Jul. 9, 2012

(65) Prior Publication Data

US 2012/0275696 A1 Nov. 1, 2012

Related U.S. Application Data

(63) Continuation of application No. 12/014,593, filed on Jan. 15, 2008, which is a continuation of application No. PCT/KR2006/002786, filed on Jul. 14, 2006.

(30) Foreign Application Priority Data

Jul. 15, 2005 (KR) .................. 10-2005-0064453

(51) Int. Cl.
*G06K 9/00* (2006.01)

(52) U.S. Cl.
USPC ........................................ 382/233

(58) Field of Classification Search
USPC .................. 382/232–233, 236, 240
See application file for complete search history.

(56) References Cited

U.S. PATENT DOCUMENTS

| 6,970,604 | B1 | 11/2005 | Chai |
| 8,229,231 | B2 * | 7/2012 | Cho et al. ................ 382/232 |
| 2005/0141617 | A1 | 6/2005 | Kim et al. |

FOREIGN PATENT DOCUMENTS

KR 10-2005-0039057 4/2005

OTHER PUBLICATIONS

International Search Report dated Oct. 30, 2006 in corresponding PCT Application PCT/KR2006/002786 (11 pp.).
Lee, J. et al., *Fast mode decision for H.264*, 2004 IEEE International Conf. on Multimedia and Expo, vol. 2, pp. 1131-1134, Jun. 30, 2004.
Pan, F. et al., *A Directional Field Based Fast Intra Mode Decision Algorithm for H.264 Video Coding*, 2004 IEEE International Conf. on Multimedia and Expo, vol. 2, pp. 1147-1150, Jun. 30, 2004.
Wiegand, T., *Draft ITU-T Recommendation and Final Draft International Standard of Joint Video Specification (ITU-T Rec. H.264 | ISO/IEC 14496-10 AVC)*, Doc. JVT-G050, Mar. 2003, pp. i-xiv, 1-250.
Written Opinion of the International Searching Authority dated Oct. 30, 2006 in corresponding International Application No. PCT/KR2006/002786 (6 pages).
Office Action mailed Sep. 15, 2011 in U.S. Appl. No. 12/014,593.
Notice of Allowance mailed Mar. 22, 2012 in U.S. Appl. No. 12/014,593.

(Continued)

*Primary Examiner* — Samir Ahmed
(74) *Attorney, Agent, or Firm* — Staas & Halsey LLP

(57) ABSTRACT

An apparatus and method for encoding and decoding an image are provided. The image decoding method includes decoding luma blocks according to a predetermined decoding mode of each of the luma blocks, and decoding chroma blocks according to the predetermined decoding mode of each of the luma blocks.

10 Claims, 20 Drawing Sheets

OTHER PUBLICATIONS

Korean Office Action for related Korean Patent Application No. 10-2006-0066578, mailed on Jul. 20, 2012.
Office Action mailed Oct. 15, 2012 in U.S. Appl. No. 13/544,340.
Office Action mailed Oct. 19, 2012 in U.S. Appl. No. 13/544,340.
U.S. Appl. No. 13/544,340, filed Jul. 9, 2012, Cho et al., Samsung Electronics Co., Ltd.

"Proposed SMPTE Standard for Television: VC-1 Compressed Video Bitstream Format and Decoding Process", SMPTE Draft Standard for Television, SMPTE 421M, SMPTE Technology Committee C24 on Video Compression Technology, Aug. 23, 2005.
U.S. Notice of Allowance mailed Feb. 20, 2013 in co-pending U.S. Appl. No. 13/544,340.
Korean Office Action issued Apr. 30, 2013 in corresponding Korean Patent Application No. 10-2013-0006693.

* cited by examiner

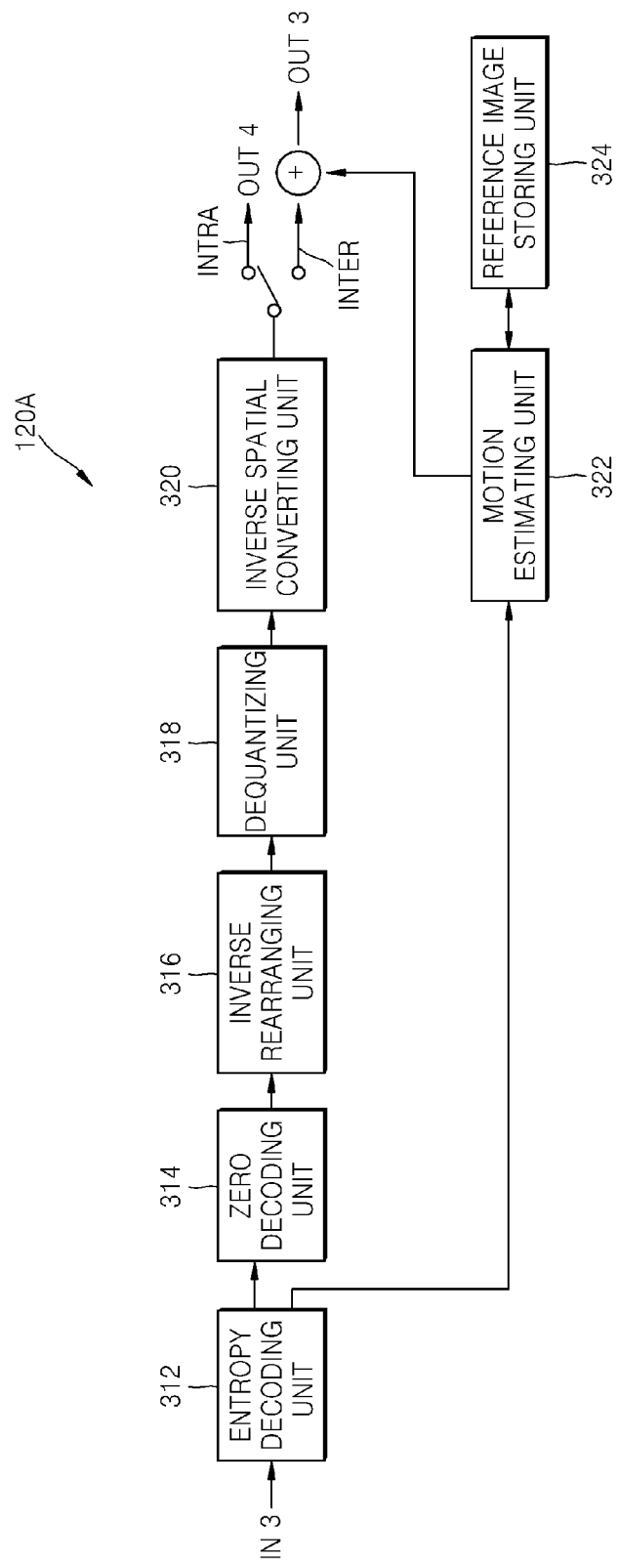

METHOD AND APPARATUS FOR ENCODING AND DECODING IMAGE

CROSS-REFERENCE TO RELATED PATENT APPLICATIONS

This application is a Continuation of U.S. patent application Ser. No. 12/014,593, filed Jan. 15, 2008, which is a Continuation of International Application No. PCT/KR2006/002786, filed Jul. 14, 2006, and claims the benefit of Korean Patent Application No. 10-2005-0064453, filed on Jul. 15, 2005, in the Korean Intellectual Property Office, the disclosures of which are incorporated herein in their entirety by reference.

BACKGROUND OF THE INVENTION

1. Field of the Invention

The present invention relates to image compression and restoration, and more particularly, to an apparatus and method for encoding and decoding an image in order to compress and restore the image comprising luma blocks and chroma blocks.

2. Description of the Related Art

If an image to be compressed is expressed in a red (R), green (G), and blue (B) color space, three RGB color components of the image have the same resolution since the three RGB color components are equally important for the image.

A human visual system (HVS) is more sensitive to luma than chroma. Therefore, a luma component has a higher resolution than a chroma component in order to express the image.

In order to compress and restore an image expressed using the luma component and the chroma component, which are separate from each other, there is an issue as to which encoding mode (or decoding mode) is used to encode (or decode) the luma component and chroma component.

SUMMARY OF THE INVENTION

The present invention provides an image decoding method of decoding a chroma block according to a decoding mode determined based on a decoding mode of a luma block.

The present invention also provides an image decoding method of decoding a chroma block according to a predetermined decoding mode of each chroma block.

The present invention also provides an image encoding method of encoding a chroma block according to an encoding mode determined based on an encoding mode of a luma block.

The present invention also provides an image encoding method of encoding a chroma block according to a predetermined encoding mode of each chroma block.

The present invention provides an image decoding apparatus for decoding a chroma block according to a decoding mode determined based on a decoding mode of a luma block.

The present invention also provides an image decoding apparatus for decoding a chroma block according to a predetermined decoding mode of each chroma block.

The present invention also provides an image encoding apparatus for encoding a chroma block according to an encoding mode determined based on an encoding mode of a luma block.

The present invention also provides an image encoding apparatus for encoding a chroma block according to a predetermined encoding mode of each chroma block.

According to an aspect of the present invention, there is provided an image decoding method including: decoding luma blocks according to a predetermined decoding mode of each luma block; and decoding chroma blocks according to the predetermined decoding mode of each luma blocks.

According to another aspect of the present invention, there is provided an image decoding method including: decoding luma blocks according to a predetermined decoding mode of each luma block; and decoding chroma blocks according to a predetermined decoding mode of each chroma block.

According to another aspect of the present invention, there is provided an image encoding method including: encoding luma blocks according to a predetermined encoding mode of each luma block; and encoding chroma blocks according to the predetermined encoding mode of each luma block.

According to another aspect of the present invention, there is provided an image encoding method including: encoding luma blocks according to a predetermined encoding mode of each luma block; and encoding chroma blocks according to a predetermined encoding mode of each chroma block.

According to another aspect of the present invention, there is provided an image decoding apparatus including: a first decoding unit decoding luma blocks according to a predetermined decoding mode of each luma block; and a second decoding unit decoding chroma blocks according to the predetermined decoding mode of each luma block.

According to another aspect of the present invention, there is provided an image decoding apparatus including: a first decoding unit decoding luma blocks according to a predetermined decoding mode of each luma block; and a second decoding unit decoding chroma blocks according to a predetermined decoding mode of each chroma block.

According to another aspect of the present invention, there is provided an image encoding apparatus including: a first encoding unit encoding luma blocks according to a predetermined encoding mode of each luma block; and a second encoding unit encoding chroma blocks according to the predetermined encoding mode of each luma block.

According to another aspect of the present invention, there is provided an image encoding apparatus including: a first encoding unit encoding luma blocks according to a predetermined encoding mode of each luma block; and a second encoding unit encoding chroma blocks according to a predetermined encoding mode of each chroma block.

BRIEF DESCRIPTION OF THE DRAWINGS

The above and other features and advantages of the present invention will become more apparent by describing in detail exemplary embodiments thereof with reference to the attached drawings in which:

FIG. 3 is a block diagram of a decoding unit illustrated in FIG. 1 according to an embodiment of the present invention;

DETAILED DESCRIPTION OF THE INVENTION

The present invention will now be described more fully with reference to the accompanying drawings, in which exemplary embodiments of the invention are shown.

Figure 1:
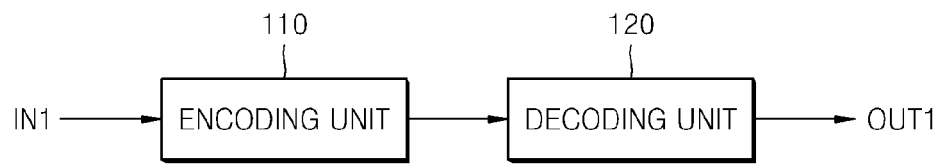
FIG. 1 is a block diagram of an image encoding/decoding apparatus according to an embodiment of the present invention.

FIG. 1 is a block diagram of an image encoding/decoding apparatus according to an embodiment of the present invention. The image encoding/decoding apparatus includes an encoding unit 110 and a decoding unit 120.

The encoding unit 110 encodes an image input through an input terminal IN1, generates a bitstream, and transmits the bitstream to the decoding unit 120. The image may be expressed using a luma component and a chroma component, which are separated from each other rather than an image expressed in a RGB color space. An image having the luma component comprises one or more luma blocks. An image having the chroma component comprises one or more chroma blocks. The image may comprise a plurality of frames in temporal sequence.

The decoding unit 120 decodes the bitstream transmitted from the encoding unit 110, restores the image, and outputs the restored image through an output terminal OUT1. If the decoding unit 120 compresses the image without any loss, the restored image is completely identical to the image input through the input terminal IN1. Similarly, if the encoding unit 110 lossy-compresses the image, the restored image is not identical to but similar to the image input through the input terminal IN1.

The image is encoded and decoded in the unit of a macroblock. In detail, the image can be compressed and restored in the unit of a macroblock. The macroblock comprises one or more luma blocks and one or more chroma blocks.

Figure 2:
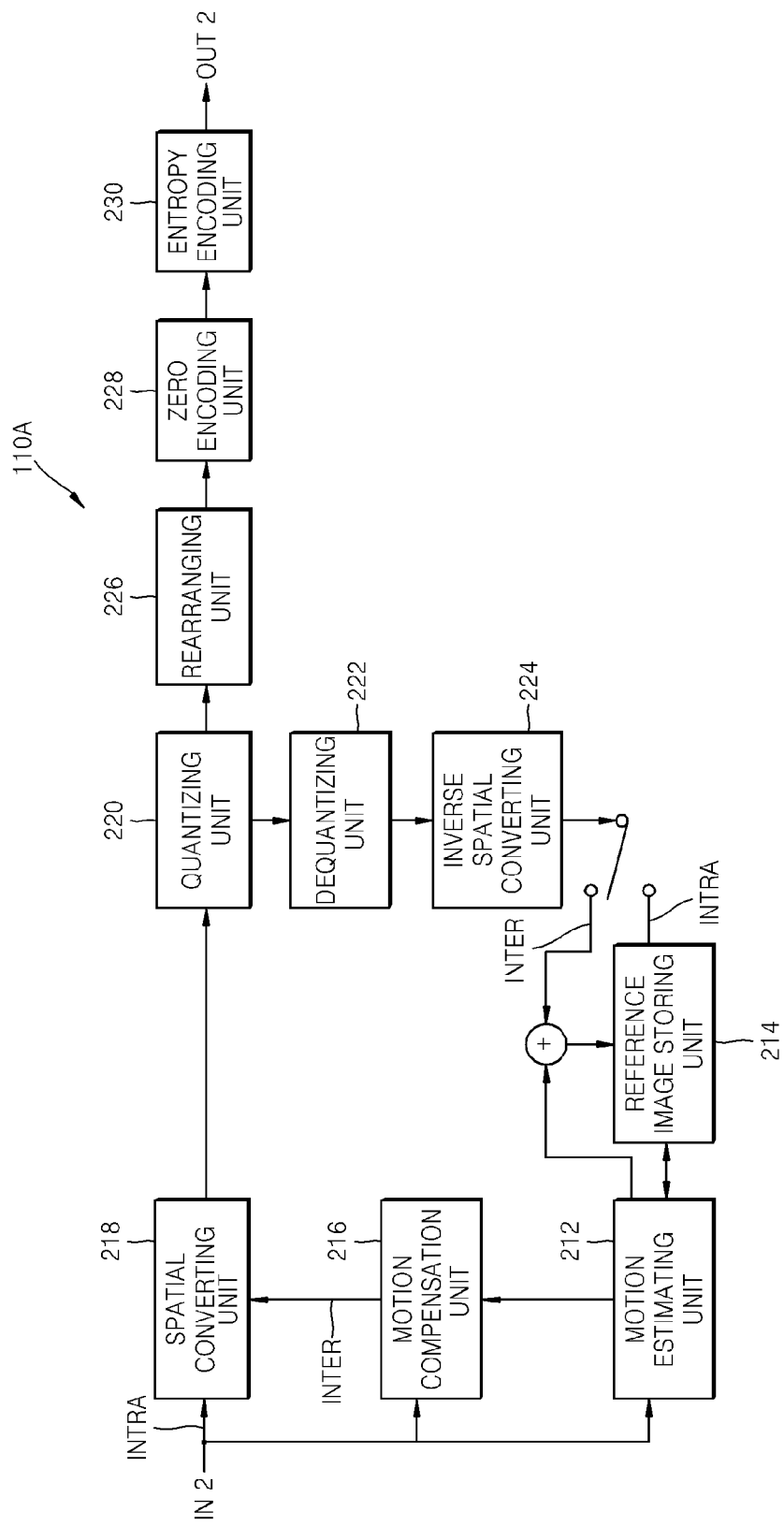
FIG. 2 is a block diagram of an encoding unit illustrated in FIG. 1 according to an embodiment of the present invention.

FIG. 2 is a block diagram of the encoding unit 110 illustrated in FIG. 1 according to an embodiment 110A of the present invention. Referring to FIG. 2, the encoding unit 110 comprises a motion estimating unit 212, a reference image storing unit 214, a motion compensation unit 216, a spatial converting unit 218, a quantizing unit 220, a dequantizing unit 222, an inverse spatial converting unit 224, a rearranging unit 226, a zero encoding unit 228, and an entropy encoding unit 230.

The encoding unit 110 can encode an image input through an input terminal IN2 according to an inter mode or an intra mode. The input terminal IN2 is identical to the input terminal IN1 illustrated in FIG. 1.

In the inter mode, an image is encoded (or decoded) using motion compensation. In the intra mode, an image is encoded (or decoded) without motion compensation.

If the encoding unit 110 encodes an image at the inter mode, all the constituents from the motion estimating unit 212 to the entropy encoding unit 230 are operated. To the contrary, if the encoding unit 110 encodes the image in the intra mode, the motion estimating unit 212, the motion compensation unit 216, the dequantizing unit 222, and the inverse spatial converting unit 224 are not operated.

The operation of the encoding unit 110 according to the inter mode will now be described. For convenience of explanation, the operation of the encoding unit 110 that performs block-based motion compensation will now be described.

The motion estimating unit 212 finds an m*n block that is the closest match to a target block (the target block is the m*n block in which m and n are natural numbers, and the m*n block is a block in which m pixels are arranged in n rows) in a reference frame. The found block is called a prediction block.

The target block is a block to be currently encoded. The reference frame indicates one or more previously encoded frames. The reference frame is stored in the reference image storing unit 214. The motion estimating unit 212 reads the reference frame stored in the reference image storing unit 214.

The motion compensating unit 216 subtracts the prediction block from the target block in order to generate a residue block. The motion compensating unit 216 generates a motion vector (MV) indicating a relative location of the target block to the prediction block.

As described above, the target block, the prediction block, the residue block are all the m*n blocks and comprise pixel values.

The spatial converting unit 218 converts the pixel values into frequencies. In detail, the spatial converting unit 218 concentrates data forming the residue block in a low frequency band.

In detail, the spatial converting unit 218 can perform a discrete cosine transform (DCT). The meaning of the DCT is described in detail in "Discrete Cosine Transform" published in 1990 by K. R. Rao and P. Yip at the Academic Press. The spatial converting unit 218 converts m*n pixel values included in the residue block into m*n DCT coefficients.

The quantizing unit 220 quantizes the DCT coefficients generated by the spatial converting unit 218. The quantizing unit 220 can perform a linear quantization and a non-linear quantization. In particular, the quantizing unit 220 performs the linear quantization so that the DCT coefficients close to 0 can be 0.

The dequantizing unit 222 and the inverse spatial converting unit 224 are operated in order to generate a reference frame to be used when a next-to-be-encoded target block is encoded.

The dequantizing unit 222 dequantizes the quantized DCT coefficients performed by the quantizing unit 220. The spatial converting unit 224 performs inverse DCT (IDCT) on the result of the dequantization performed by the dequantizing unit 222. Therefore, the inverse spatial converting unit 224 generates a residue block.

In this case, the residue block and the prediction block found by the motion estimating unit 212 are added together in order to restore the target block. The restored target bock is stored in the reference image storing unit 214 as a part of the reference frame.

The rearranging unit 226 scans the results quantized by the quantizing unit 220 in a zigzag shape and rearranges the scanned results. The zero encoding unit 228 can perform run-level (RL) encoding. In detail, the zero encoding unit 228 can more simply rearrange the rearranged values. In more detail, the zero encoding unit 228 can express continuously the rearranged values (run, level). The run denotes the number of 0s in the front of the rearranged values. The level denotes the rearranged values other than 0.

The entropy encoding unit 230 entropy-encodes the results encoded by the zero encoding unit 228. Also, the entropy encoding unit 230 entropy-encodes the motion vector generated by the motion compensating unit 216. The results entropy-encoded by the entropy encoding unit 230 are output as one bitstream through an output terminal OUT2.

The operation of the decoding unit 110 according to the intra mode will now be described.

The spatial converting unit 218 converts a pixel value of the image input through the input terminal IN2 into a frequency. In detail, the spatial converting unit 218 concentrates data forming the image in a low frequency band. In more detail, the spatial converting unit 218 can perform the DCT.

The quantizing unit 220 quantizes the DCT coefficients produced by the spatial converting unit 218. The quantizing unit 220 can perform a linear quantization or a non-linear quantization. In particular, the quantizing unit 220 performs the non-linear quantization, so that the DCT coefficients close to 0 can be 0.

The rearranging unit 226 scans the results of the quantization performed by the quantizing unit 220 in a zigzag shape and rearranges the scanned results. The zero encoding unit 228 can perform run-level (RL) encoding. In detail, the zero encoding unit 228 can more simply rearrange the rearranged values. In more detail, the zero encoding unit 228 can continuously express the rearranged values (run, level). The run denotes the number of 0s in the front of the rearranged values. The level denotes the rearranged values other than 0.

The entropy encoding unit 230 entropy-encodes the results encoded by the zero encoding unit 228. The results of the entropy-encoding performed by the entropy encoding unit 230 are output as one bitstream through an output terminal OUT2.

FIG. 3 is a block diagram of the decoding unit 120 illustrated in FIG. 1 according to an embodiment 120A of the present invention. Referring to FIG. 3, the decoding unit 120 comprises an entropy decoding unit 312, a zero decoding unit 314, an inverse rearranging unit 316, a dequantizing unit 318, an inverse spatial converting unit 320, a motion estimating unit 322, and a reference image storing unit 324.

The decoding unit 120 can decode a bitstream input through an input terminal IN3 according to an inter mode or an intra mode. The bitstream input through the input terminal IN3 can be the bitstream output through the output terminal OUT2 illustrated in FIG. 2.

If the decoding unit 120 decodes the bitstream in the inter mode, all the constituents, from the entropy decoding unit 312 to the reference image storing unit 324, are operated. To the contrary, if the decoding unit 120 decodes the bitstream at the intra mode, the motion estimating unit 322 is not operated.

The operation of the decoding unit 120 according to the inter mode will now be described.

The entropy decoding unit 312 entropy-decodes the bitstream input through the input terminal IN3, so that the entropy decoding unit 312 can extract results of the RL-decoding performed by the zero decoding unit 228 and can extract the motion vector generated by the motion compensating unit 216 from the bitstream input through the input terminal IN3.

The zero decoding unit 314 performs the RL-decoding. The inverse rearranging unit 316 generates the results of the quantization performed by the quantizing unit 220.

The dequantizing unit 318 dequantizes the results generated by the quantizing unit 220 input from the inverse rearranging unit 316. The inverse spatial converting unit 320 performs an inverse space conversion (e.g., the IDCT) on the results of the dequantization performed by the dequantizing unit 318. The inverse spatial converting unit 318 generates a residue block.

The motion estimating unit 322 finds a prediction block in a reference frame stored in the reference image storing unit 324 using the motion vector extracted from the entropy decoding unit 312.

The residue block generated by the inverse spatial converting unit 318 and the prediction block found by the motion estimating unit 322 are added together in order to restore a target block. The restored target block is output through the output terminal OUT3. The restored target block is stored in the reference image storing unit 324 as a part of the reference frame.

The operation of the decoding unit 120 according to the intra mode will now be described.

The entropy decoding unit 312 extracts the results of the RL-decoding performed by the zero decoding unit 228 from the bitstream input through the input terminal IN3.

The zero decoding unit 314 performs the RL-decoding. The inverse rearranging unit 316 generates the results of quantization performed by the quantizing unit 220.

The dequantizing unit 318 dequantizes the results generated by the inverse rearranging unit 316. The inverse spatial converting unit 320 performs the inverse space conversion (e.g., the IDCT) on the results of dequantization performed by the dequantizing unit 318, so that the inverse spatial converting unit 318 restores an image and outputs the restored image through an output terminal OUT4. The restored image can be stored in the reference image storing unit 324.

Figure 4A:
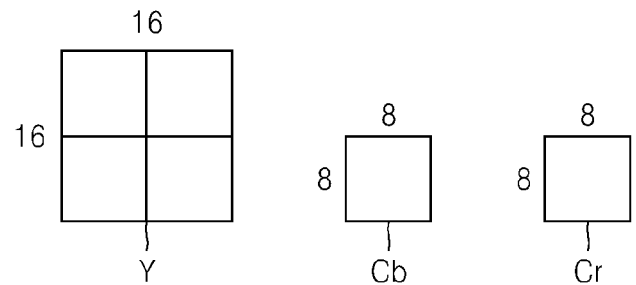
FIGS. 4A, 4B, and 4C are diagrams illustrating macroblocks of images in a 4:2:0 format, a 4:2:2 format, and a 4:4:4 format, respectively.
Figure 4B:
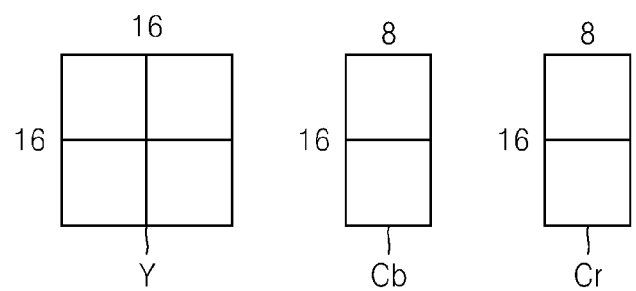
Figure 4C:
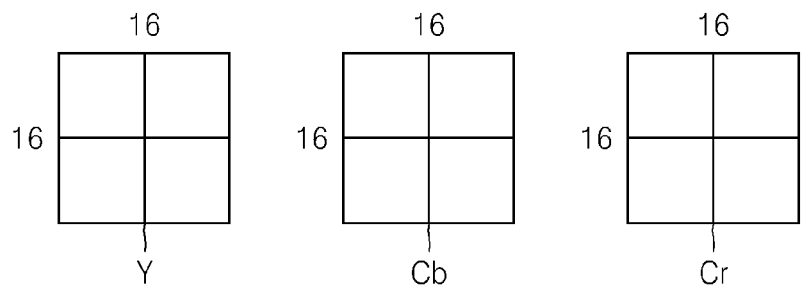

FIGS. 4A, 4B, and 4C are diagrams illustrating macroblocks of images in a 4:2:0 format, a 4:2:2 format, and a 4:4:4 format, respectively.

Referring to FIG. 4A, a macroblock of a 4:2:0 format image comprises four luma blocks Y, one blue chroma block Cb, and one red chroma block Cr. Each of the luma blocks Y, the blue chroma block Cb, and the red chroma block Cr is an 8*8 block. In detail, each of the luma blocks Y, the blue chroma block Cb, and the red chroma block Cr has eight pixels in eight rows (=64 samples).

Referring to FIG. 4B, a macroblock of a 4:2:2 format image comprises four luma blocks Y, two blue chroma blocks Cb, and two red chroma blocks Cr. Each of the luma blocks Y, the blue chroma blocks Cb, and the red chroma blocks Cr is an 8*8 block. In detail, each of the luma blocks Y, the blue chroma blocks Cb, and the red chroma blocks Cr has eight pixels in eight rows (=64 samples).

Referring to FIG. 4C, a macroblock of a 4:4:4 format image comprises four luma blocks Y, four blue chroma blocks Cb, and four red chroma blocks Cr. Each of the luma blocks Y, the blue chroma blocks Cb, and the red chroma blocks Cr is an 8*8 block. In detail, each of the luma blocks Y, the blue chroma blocks Cb, and the red chroma blocks Cr has eight pixels in eight rows (=64 samples).

Figure 5:
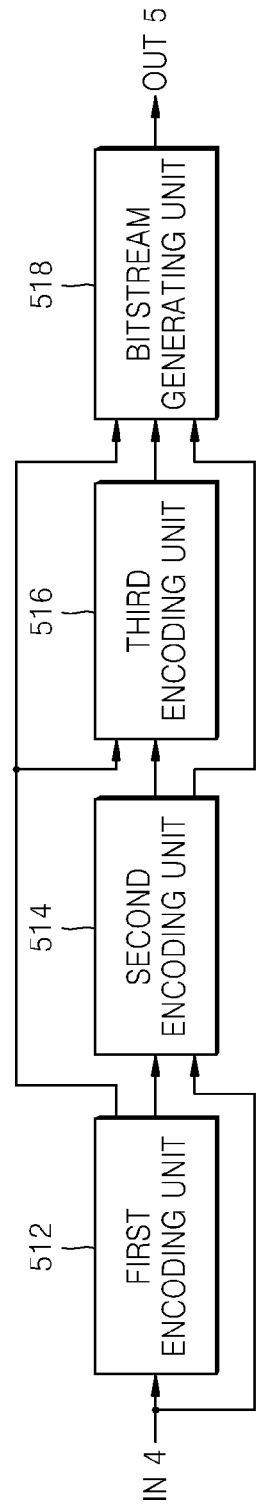
FIG. 5 is a block diagram of an image encoding apparatus according to an embodiment of the present invention.

FIG. 5 is a block diagram of an image encoding apparatus according to an embodiment of the present invention. Referring to FIG. 5, the image encoding apparatus comprises a first encoding unit 512, a second encoding unit 514, a third encoding unit 516, and a bitstream generating unit 518.

The first encoding unit 512 and the second encoding unit 514 are realized as the encoding unit 110 comprising the motion estimating unit 212, the reference image storing unit 214, the motion compensation unit 216, the spatial converting unit 218, the quantizing unit 220, the dequantizing unit 222, the inverse spatial converting unit 224, the rearranging unit 226, the zero encoding unit 228, and the entropy encoding unit 230 as illustrated in FIG. 2.

In detail, the first encoding unit 512 indicates the encoding unit 110 that encodes the luma block Y input through the input terminal IN2. The second encoding unit 514 indicates the encoding unit 110 that encodes the chroma block Cb or Cr input through the input terminal IN2.

The first encoding unit 512 encodes luma blocks Y included in the image input through the input terminal IN4 according to a predetermined encoding mode of each of the luma blocks Y. The input terminal IN4 is identical to the input terminal IN2 illustrated in FIG. 2.

According to an embodiment of the present invention, the second encoding unit 514 encodes chroma blocks Cb or Cr included in the image input through the input terminal IN4 according to a majority of encoding modes among the predetermined encoding modes of the luma blocks Y. The image may have one of the 4:2:0 format, the 4:2:2 format, and the 4:4:4 format.

According to another embodiment of the present invention, the second encoding unit 514 encodes the chroma blocks Cb or Cr included in the image input through the input terminal IN4 according to a predetermined encoding mode of each of the chroma blocks Cb or Cr. The image may have one of the 4:2:0 format, the 4:2:2 format, and the 4:4:4 format.

The encoding mode used to encode the chroma blocks Cb or Cr included in the image may be already determined before the image is input to the motion estimating unit 212 or the motion compensating unit 216.

According to another embodiment of the present invention, the second encoding unit 514 encodes the chroma block Cb or Cr included in the image input through the input terminal IN4 according to an encoding mode of a luma block having the same phase as that of the chroma block Cb or Cr. The image may have one of the 4:2:2 format and the 4:4:4 format.

In the above embodiments of the present invention, the encoding mode used to encode each of the luma blocks Y included in the image may be already determined when the image is input through the input terminal IN4. Similarly, in the second embodiment of the present invention, the encoding mode used to encode each of the luma blocks, each of the blue chroma blocks Cb, and each of the red chroma blocks Cr included in the image may be already determined when the image is input through the input terminal IN4. The image and mode information are input into the input terminal IN4. The mode information indicates the encoding mode (or a decoding mode). The encoding mode (or the decoding mode) can be an inter mode or an intra mode.

A motion information generating unit (not shown) may be included in the image encoding apparatus of an embodiment of the present invention and may generate motion information. The motion information generating unit may generate motion information on some of the luma blocks encoded by the first encoding unit 512. Likewise, the motion information generating unit may generate motion information on some of the chroma blocks encoded by the second encoding unit 514.

The motion information includes the mode information and a coded block pattern (CBP). If the mode information indicates the inter mode, the motion information also includes information on a motion vector.

The CBP indicates whether the results of the quantization include a value other than 0. The image encoding apparatus of an embodiment of the present invention can include a CBP generating unit (not shown). Every time a block is completely quantized by the quantizing unit 220, the CBP generating unit (not shown) checks whether a result of the quantization includes a value other than 0, if the result of the quantization includes a value other than 0, generates 1 as the CBP of the block, and, if the result of the quantization does not include a value other than 0, generates 0 as the CBP of the block.

The motion information generating unit (not shown) generates the motion information including the mode information input through the input terminal IN4 and the CBP generated by the CBP generating unit.

The third encoding unit 516 encodes the motion information generated by the motion information generating unit.

The bitstream generating unit 518 is realized by the entropy encoding unit 230.

The bitstream generating unit 518 generates a bitstream by combining the results of the encoding performed by the first encoding unit 512, the results of the encoding performed by the second encoding unit 514, and the results of the encoding performed by the third encoding unit 516 and outputs the bitstream through an output terminal OUT5. The output terminal OUT5 is identical to the output terminal OUT2 illustrated in FIG. 2.

Figure 6:
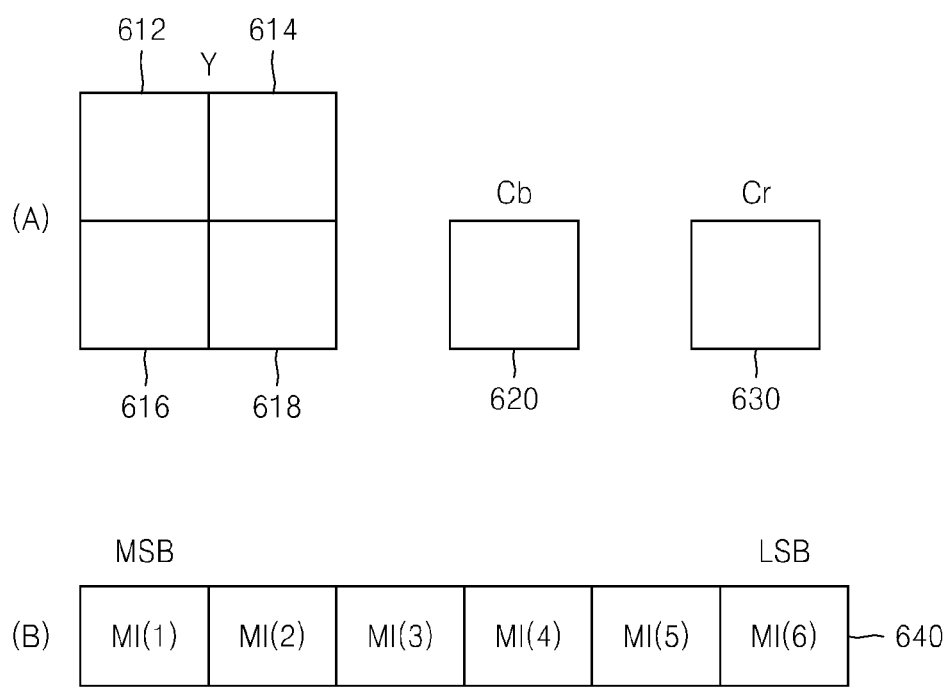
FIGS. 6 through 8 are diagrams for explaining motion information (MI)
Figure 7:
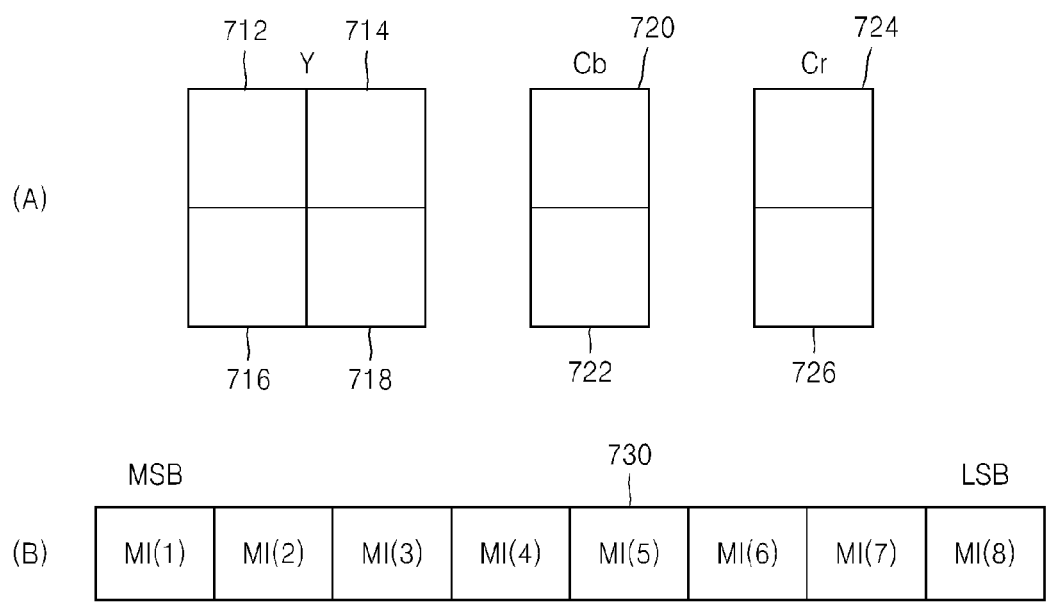
Figure 8:
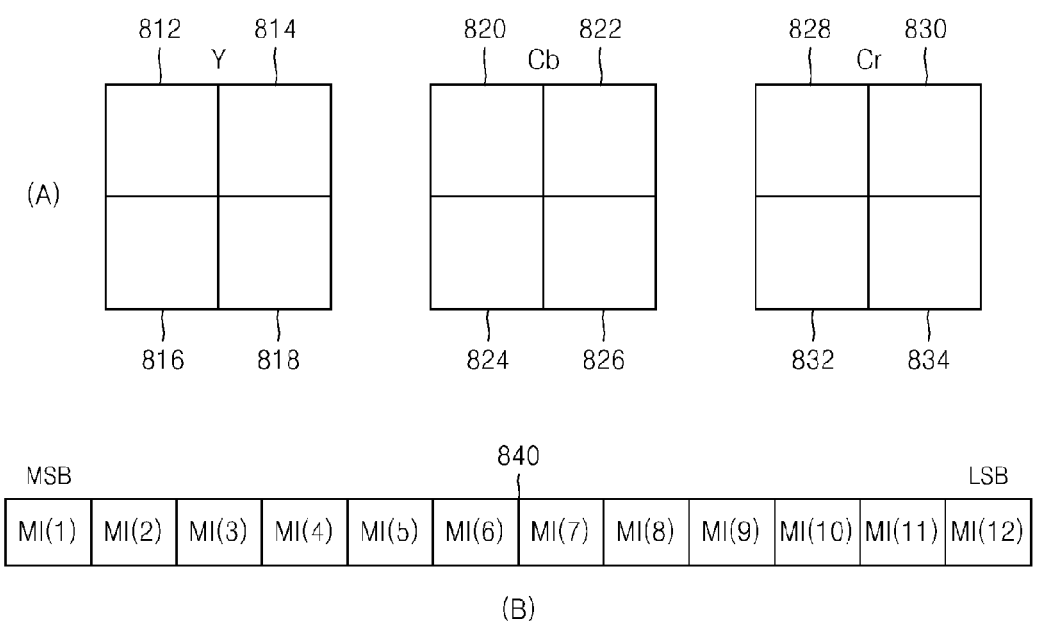

FIGS. 6 through 8 are diagrams for explaining motion information (MI). Referring to FIGS. 6 through 8, the MI can be included in each block or in some of the blocks.

Referring to FIG. 6A, the macroblock of the 4:2:0 format image illustrated in FIG. 4A includes first through sixth blocks 612, 614, 616, 618, 620, and 630.

Referring to FIG. 6B, MI on the macroblock illustrated in FIG. 6A is expressed as bitstream 640. MI(t) (t denotes positive numbers between 1 and 6, $1 \leq t \leq 6$) indicates MI on a $t^{th}$ block generated by the motion information generating unit.

Referring to FIG. 7A, the macroblock of the 4:2:2 format image illustrated in FIG. 4B includes first through eighth blocks 712, 714, 716, 718, 720, 722, 724, and 726.

Referring to FIG. 7B, MI on the macroblock illustrated in FIG. 7A is expressed as bitstream 730. MI(u) (u denotes positive numbers between 1 and 8, $1 \leq u \leq 8$) indicates MI on a $u^{th}$ block generated by the motion information generating unit. Referring to FIG. 8A, the macroblock of the 4:4:4 format image illustrated in FIG. 4C includes first through twelfth blocks 812, 814, 816, 818, 820, 822, 824, 826, 828, 830, 832, and 834.

Referring to FIG. 8B, MI on the macroblock illustrated in FIG. 8A is expressed as bitstream 730. MI(v) (v denotes positive numbers between 1 and 12, $1 \leq v \leq 12$) indicates MI on a $v^{th}$ block generated by the motion information generating unit.

Figure 9:
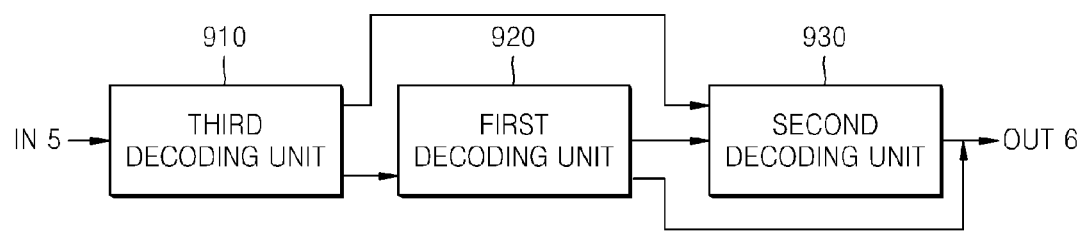
FIG. 9 is a block diagram of an image decoding apparatus according to an embodiment of the present invention.

FIG. 9 is a block diagram of an image decoding apparatus according to an embodiment of the present invention. Referring to FIG. 9, the image decoding apparatus comprises a third decoding unit 910, a first decoding unit 920, and a second decoding unit 930.

The third decoding unit 910 extracts motion information from the bitstream input through the input terminal IN5, and decodes the extracted motion information. The input terminal IN5 is identical to the input terminal IN3 illustrated in FIG. 3.

The first decoding unit 920 and the second decoding unit 930 are realized by using the decoding unit 120 comprising the entropy decoding unit 312, the zero decoding unit 314, the inverse rearranging unit 316, the dequantizing unit 318, the inverse spatial converting unit 320, the motion estimating unit 322, and the reference image storing unit 324.

The first decoding unit 920 indicates the decoding unit 120 that decodes luma blocks Y. Likewise, the second decoding unit 930 indicates the decoding unit 120 that decodes chroma blocks Cb or Cr.

The first decoding unit 920 decodes the luma blocks Y according to a predetermined decoding mode of each of the luma blocks Y. In detail, the predetermined decoding mode is already represented in the bitstream input through the input terminal IN5.

Therefore, the first decoding unit 920 checks whether MI decoded by the third decoding unit 910 includes MI on a luma block that is to be decoded.

If it is determined that the MI decoded by the third decoding unit 910 does not include MI on the luma block that is to be decoded, the first decoding unit 920 decodes the luma block that is to be decoded according to a constant decoding mode. The constant decoding mode can be an inter mode or an intra mode.

To the contrary, if it is determined that the MI decoded by the third decoding unit 910 includes MI on the luma block that is to be decoded, the first decoding unit 920 analyzes whether mode information included in the decoded MI indicates the inter mode or the intra mode as the decoding mode. In this regard, the first decoding unit 920 decodes the luma block that is to be decoded according to the analyzed decoding mode.

According to an embodiment of the present invention, the second decoding unit 930 decodes the chroma blocks Cb or Cr included in an image according to a majority of decoding modes among the predetermined decoding modes of the luma blocks Y. The image may have one of the 4:2:0 format, the 4:2:2 format, and the 4:4:4 format.

According to another embodiment of the present invention, the second decoding unit 930 decodes the chroma blocks Cb or Cr included in the image according to a predetermined decoding mode of each of the chroma blocks Cb or Cr.

The image may have one of the 4:2:0 format, the 4:2:2 format, and the 4:4:4 format.

In detail, the predetermined decoding mode is already represented in the bitstream input through the input terminal IN5.

Therefore, the second decoding unit 930 checks whether the MI decoded by the third decoding unit 910 includes MI on a chroma block that is to be decoded.

If it is determined that the MI decoded by the third decoding unit 910 does not include MI on the chroma block that is to be decoded, the second decoding unit 930 decodes the chroma block that is to be decoded according to a constant decoding mode. The constant decoding mode can be the inter mode or the intra mode.

To the contrary, if it is determined that the MI decoded by the third decoding unit 910 includes MI on the chroma block that is to be decoded, the second decoding unit 930 analyzes whether the mode information included in the decoded MI indicates the inter mode or the intra mode as the decoding mode. In this regard, the second decoding unit 930 decodes the chroma block to be decoded according to the analyzed decoding mode.

According to another embodiment of the present invention, the second decoding unit 930 decodes the chroma blocks Cb or Cr included in the image according to a decoding mode of a luma block having the same phase as that of the chroma block Cb or Cr. The image may have one of the 4:2:2 format and the 4:4:4 format.

The luma blocks decoded by the first decoding unit 920 and the chroma blocks decoded by the second decoding unit 930 are output through an output terminal OUT6. The output terminal 6 is identical to the output terminal OUT3 or OUT4 illustrated in FIG. 3.

Figure 10:
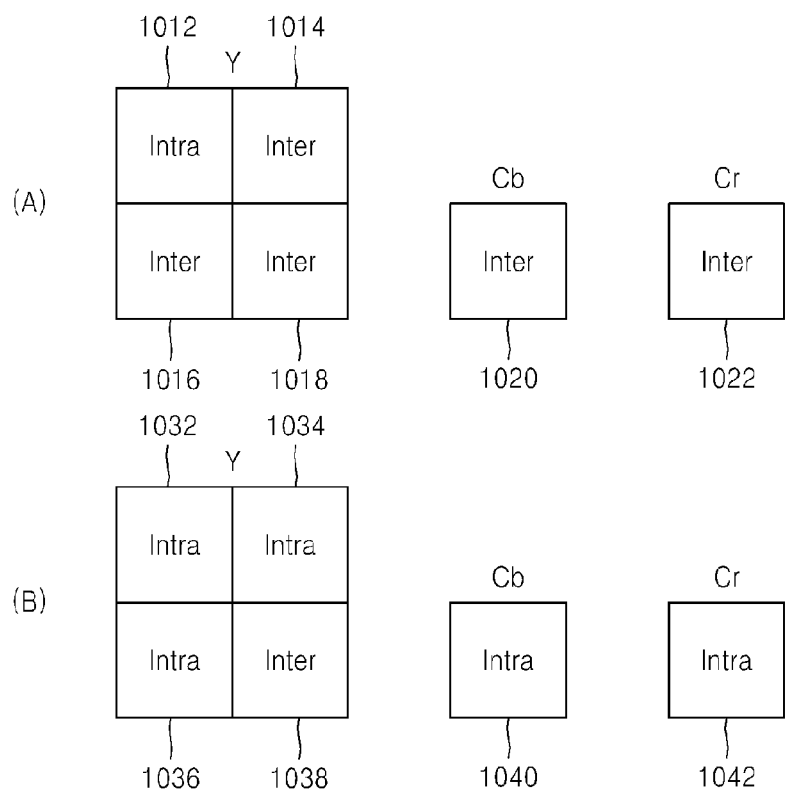
FIG. 10 (Parts (A) and (B)) are diagrams for explaining the principle of encoding/decoding an image using a 1 motion vector (MV)

FIGS. 10A and 10B are diagrams for explaining the principle of encoding/decoding an image using a 1 motion vector (MV). The 1 MV indicates an encoding/decoding method used when a macroblock needs 1 MV at the most. For convenience of explanation, referring to FIGS. 10A and 10B, the blocks have a 4:2:0 image format.

If the blocks are encoded/decoded using the 1 MV, luma blocks 1012, 1014, 1016, 1018, 1032, 1034, 1036, and 1038, blue chroma blocks 1020 and 1040, and red chroma blocks 1022 and 1042 have the same encoding mode (or the same decoding mode).

Figure 11:
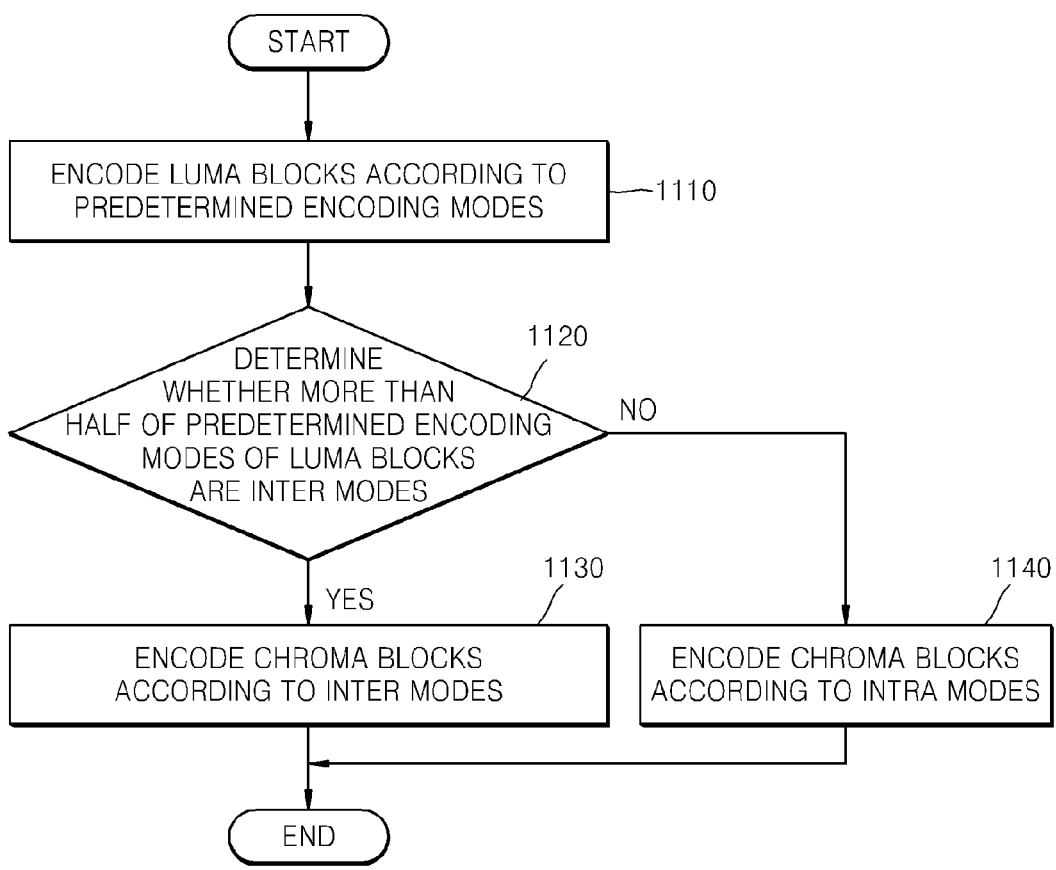
FIG. 11 is a flowchart illustrating an image encoding method according to an embodiment of the present invention.

FIG. 11 is a flowchart illustrating an image encoding method according to an embodiment of the present invention. Referring to FIG. 11, the image encoding method comprises operations 1110 through 1140 of encoding luma blocks and then encoding chroma blocks according to encoding modes determined based on encoding modes of the luma blocks.

The first encoding unit 512 encodes the luma blocks according to predetermined encoding modes (Operation 1110).

The second encoding unit 514 encodes the chroma blocks according to a majority of encoding modes among the predetermined decoding modes of the luma blocks (Operations 1120 through 1140).

In detail, the second encoding unit 514 determines whether more than half of the predetermined encoding modes of the luma blocks are inter modes (Operation 1120). In Operation 1120, the second encoding unit 514 can determine whether more than half of the predetermined encoding modes of the luma blocks are inter modes. Or in Operation 1120, unlike FIG. 11, the second encoding unit 514 can determine whether more than half of the predetermined encoding modes of the luma blocks are intra modes.

If the second encoding unit 514 determines that more than half of the predetermined encoding modes of the luma blocks are inter modes in Operation 1120, the second encoding unit 514 encodes the chroma blocks according to an inter mode (Operation 1130). If the second encoding unit 514 determines that more than half of the predetermined encoding modes of the luma blocks are not inter modes in Operation 1120, the second encoding unit 514 encodes the chroma blocks according to an intra mode (Operation 1140).

Figure 12:
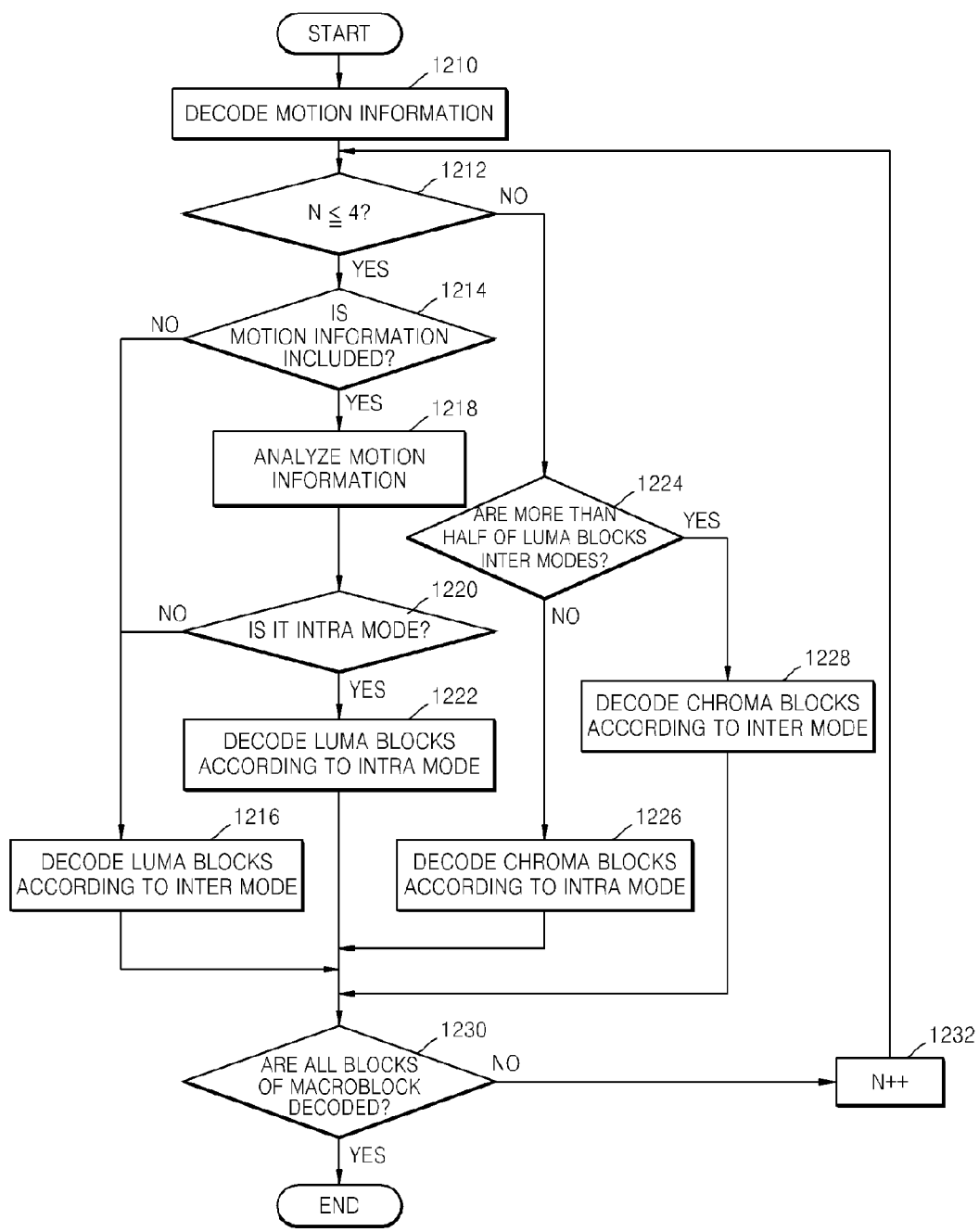
FIG. 12 is a flowchart illustrating an image decoding method according to an embodiment of the present invention.

FIG. 12 is a flowchart illustrating an image decoding method according to an embodiment of the present invention. Referring to FIG. 12, the image decoding method comprises operations 1210 through 1232 of decoding luma blocks and then decoding chroma blocks according to decoding modes determined based on decoding modes of the luma blocks.

The third decoding unit 910 decodes MI (Operation 1210). The first decoding unit 920 determines whether a block that is to be decoded is a luma block (Operation 1212).

N denotes a decoding priority and can be t, u, or v as described above.

If the first decoding unit 920 determines in Operation 1212 that the block that is to be decoded is the luma block, the first decoding unit 920 determines whether MI on the block that is to be decoded is included in the MI decoded in Operation 1210 (Operation 1214).

If the first decoding unit 920 determines that the MI on the block that is to be decoded is not included in the decoded MI, the first decoding unit 920 decodes the blocks that are to be decoded according to an inter mode (Operation 1216). Unlike Operation 1216, the first decoding unit 920 can decode the block that is to be decoded according to an intra mode.

If the first decoding unit 920 determines that the MI on the block that is to be decoded is included in the decoded MI, the first decoding unit 920 analyzes the MI on the block that is to be decoded (Operation 1218).

The first decoding unit determines whether the MI analyzed in Operation 1218 is the intra mode (Operation 1220).

If the first decoding unit 920 determines in Operation 1220 that the MI is the intra mode, the first decoding unit 920 decodes the block that is to be decoded according to the intra mode (Operation 1222). To the contrary, if the first decoding unit 920 determines in Operation 1220 that the MI is the inter mode, the first decoding unit 920 performs Operation 1216.

If the first decoding unit 920 determines in Operation 1212 that the block that is to be decoded is a chroma block, the second decoding unit 930 determines whether more than half of the decoding modes of all luma blocks included in the same macroblock as the block that is to be decoded are inter modes (Operation 1224).

Unlike FIG. 12, the second decoding unit 930 can determine whether more than half of the decoding modes of all luma blocks included in the same macroblock as the block that is to be decoded are intra modes in Operation 1224.

If the second decoding unit 930 determines in Operation 1224 that more than half of the decoding modes of all luma blocks included in the same macroblock as the block that is to be decoded are not inter modes, the second decoding unit 930 decodes the block to be decoded according to the intra mode (Operation 1226).

If the second decoding unit 930 determines in Operation 1224 that more than half of the decoding modes of all luma blocks included in the same macroblock as the block that is to be decoded are inter modes, the second decoding unit 930 decodes the block to be decoded according to the inter mode (Operation 1228).

It is checked whether all the blocks of the macroblock are decoded (Operation 1230). If it is determined that the macroblock has undecoded blocks, Operations 1232 and 1212 are performed.

Figure 13:
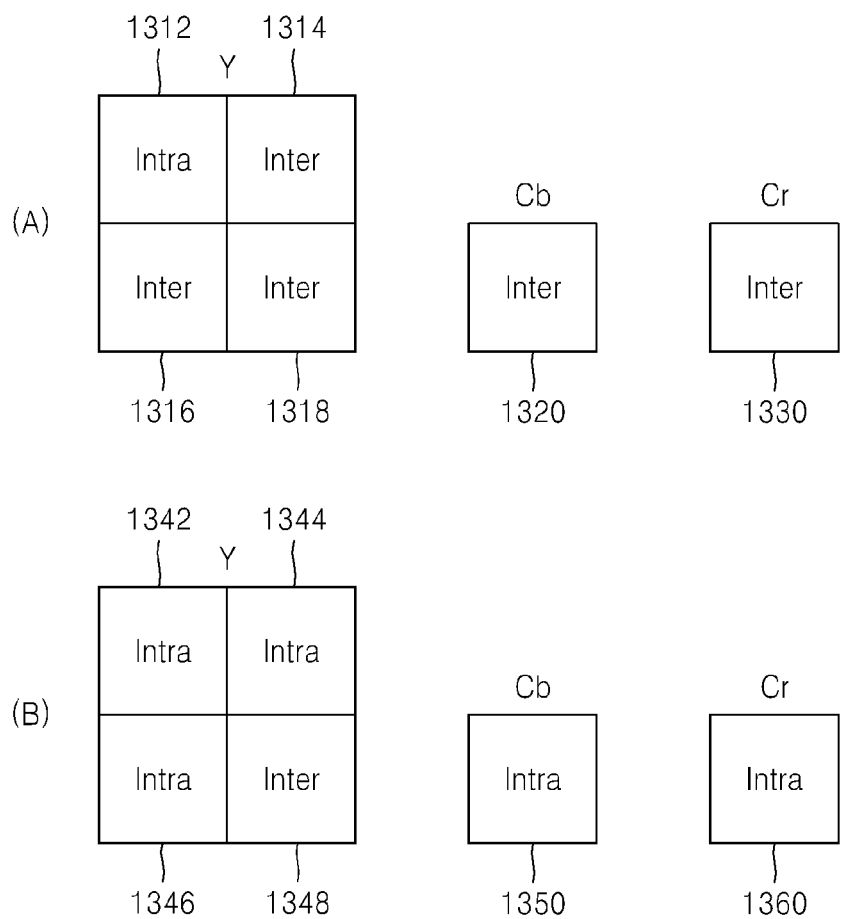
FIGS. 13 through 15 are diagrams for explaining the principle of encoding/decoding an image using a 4 MV according to an embodiment of the present invention.
Figure 14:
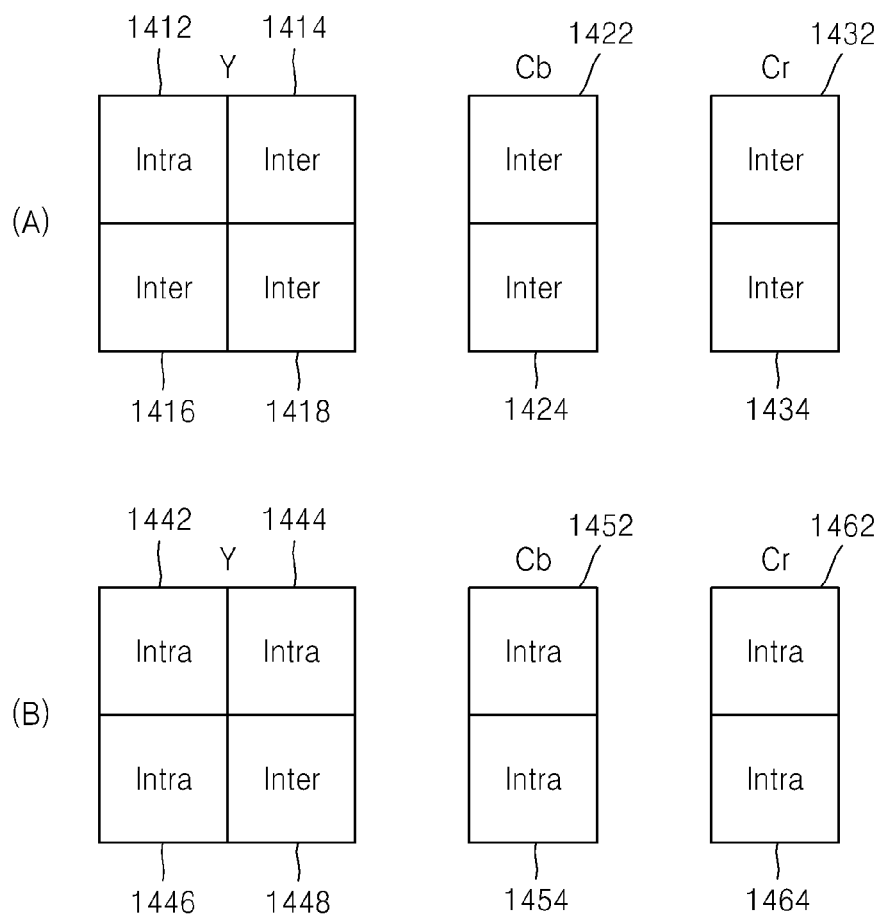
Figure 15:
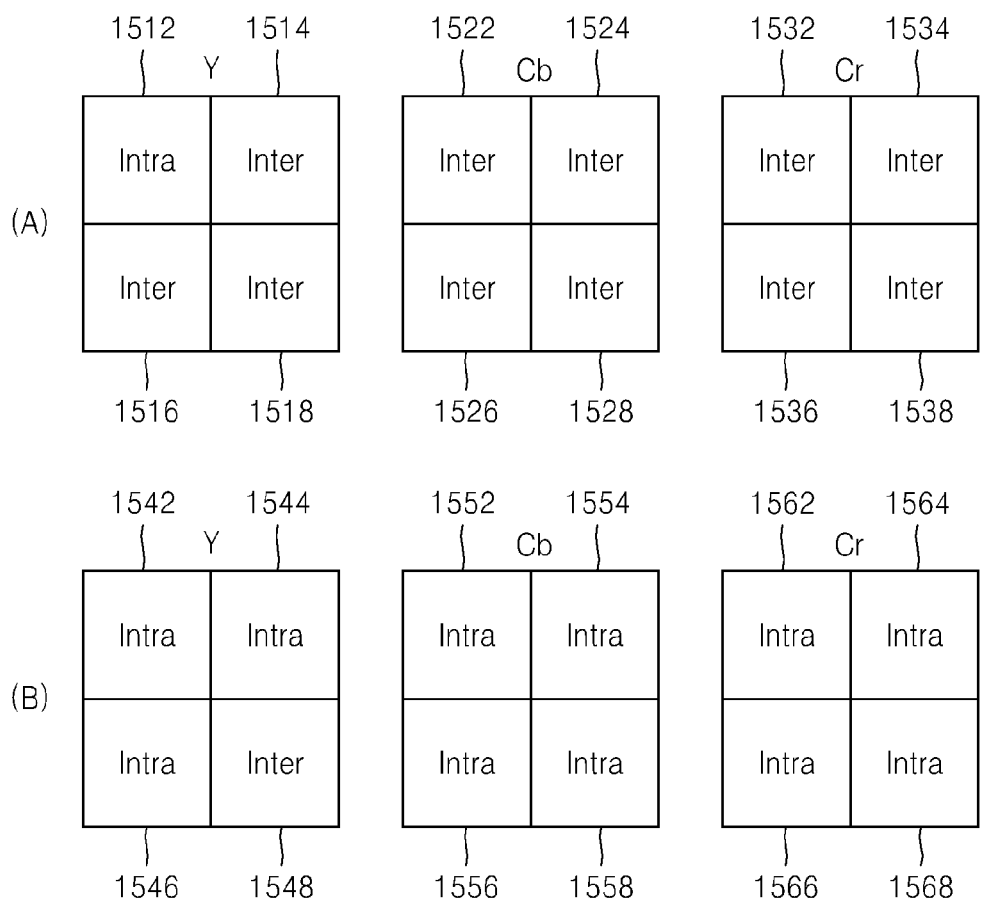

FIGS. 13 through 15 are diagrams for explaining the principle of encoding/decoding an image using a 4 MV according to an embodiment of the present invention. The 4 MV indicates an encoding/decoding method when a macroblock needs 4 MVs at the most. Referring to FIGS. 13A and 13B, the macroblocks have a 4:2:0 image format.

Referring to FIG. 13A, luma blocks 1312, 1314, 1316, and 1318 are encoded/decoded according to an intra mode, an inter mode, an inter mode, and an inter mode, respectively. A majority of encoding modes (or decoding modes) among encoding modes (or decoding modes) of the luma blocks 1312, 1314, 1316, and 1318 are inter modes. Therefore, a blue chroma block 1320 is encoded/decoded according to the inter mode. Likewise, a red chroma block 1330 is encoded/decoded according to the inter mode.

Similarly, referring to FIG. 13B, luma blocks 1342, 1344, 1346, and 1348 are encoded/decoded according to an intra mode, an intra mode, an intra mode, and an inter mode, respectively. A majority of encoding modes (or decoding modes) among encoding modes (or decoding modes) of the luma blocks 1342, 1344, 1346, and 1348 are intra modes. Therefore, a blue chroma block 1350 is encoded/decoded according to the intra mode. Likewise, a red chroma block 1360 is encoded/decoded according to the intra mode.

Referring to FIGS. 14A and 14B, the macroblocks have a 4:2:2 image format. Referring to FIG. 14A, luma blocks 1412, 1414, 1416, and 1418 are encoded/decoded according to an intra mode, an inter mode, an inter mode, and an inter mode, respectively. A majority of encoding modes (or decoding modes) among encoding modes (or decoding modes) of the luma blocks 1412, 1414, 1416, and 1418 are inter modes. Therefore, blue chroma blocks 1422 and 1424 is encoded/decoded according to the inter mode. Likewise, red chroma blocks 1432 and 1434 are encoded/decoded according to the inter mode.

Similarly, referring to FIG. 14B, luma blocks 1442, 1444, 1446, and 1448 are encoded/decoded according to an intra mode, an intra mode, an intra mode, and an inter mode, respectively. A majority of encoding modes (or decoding modes) among encoding modes (or decoding modes) of the luma blocks 1442, 1444, 1446, and 1448 are intra modes. Therefore, blue chroma blocks 1452 and 1454 are encoded/decoded according to the intra mode. Likewise, red chroma blocks 1462 and 1464 are encoded/decoded according to the intra mode.

Referring to FIGS. 15A and 15B, the macroblocks have a 4:4:4 image format. Referring to FIG. 15A, luma blocks 1512, 1514, 1516, and 1518 are encoded/decoded according to an intra mode, an inter mode, an inter mode, and an inter mode, respectively. A majority of encoding modes (or decoding modes) among encoding modes (or decoding modes) of the luma blocks 1512, 1514, 1516, and 1518 are inter modes. Therefore, blue chroma blocks 1522, 1524, 1526, and 1528 are encoded/decoded according to the inter mode. Likewise, red chroma blocks 1432, 1534, 1536, and 1538 are encoded/decoded according to the inter mode.

Similarly, referring to FIG. 15B, luma blocks 1542, 1544, 1546, and 1548 are encoded/decoded according to an intra mode, an intra mode, an intra mode, and an inter mode, respectively. A majority of encoding modes (or decoding modes) among encoding modes (or decoding modes) of the luma blocks 1542, 1544, 1546, and 1548 are intra modes. Therefore, blue chroma blocks 1552, 1554, 1556, and 1558 are encoded/decoded according to the intra mode. Likewise, red chroma blocks 1562, 1564, 1566, and 1568 are encoded/decoded according to the intra mode.

Figure 16:
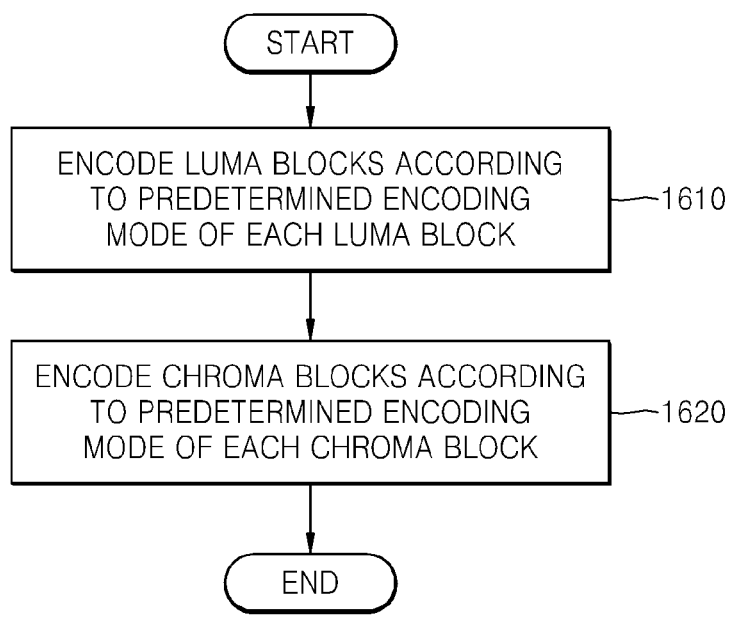
FIG. 16 is a flowchart illustrating an image encoding method according to another embodiment of the present invention.

FIG. 16 is a flowchart illustrating an image encoding method according to another embodiment of the present invention. Referring to FIG. 16, the first encoding unit 512 encodes luma blocks according to a predetermined encoding mode of each luma block (Operation 1610). The second encoding unit 514 encodes chroma blocks according to a predetermined encoding mode of each chroma block (Operation 1620).

Operation 1620 can be performed after Operation 1610 has been performed, before Operation 1610 has been performed, or simultaneously while Operation 1610 is being performed.

Figure 17:
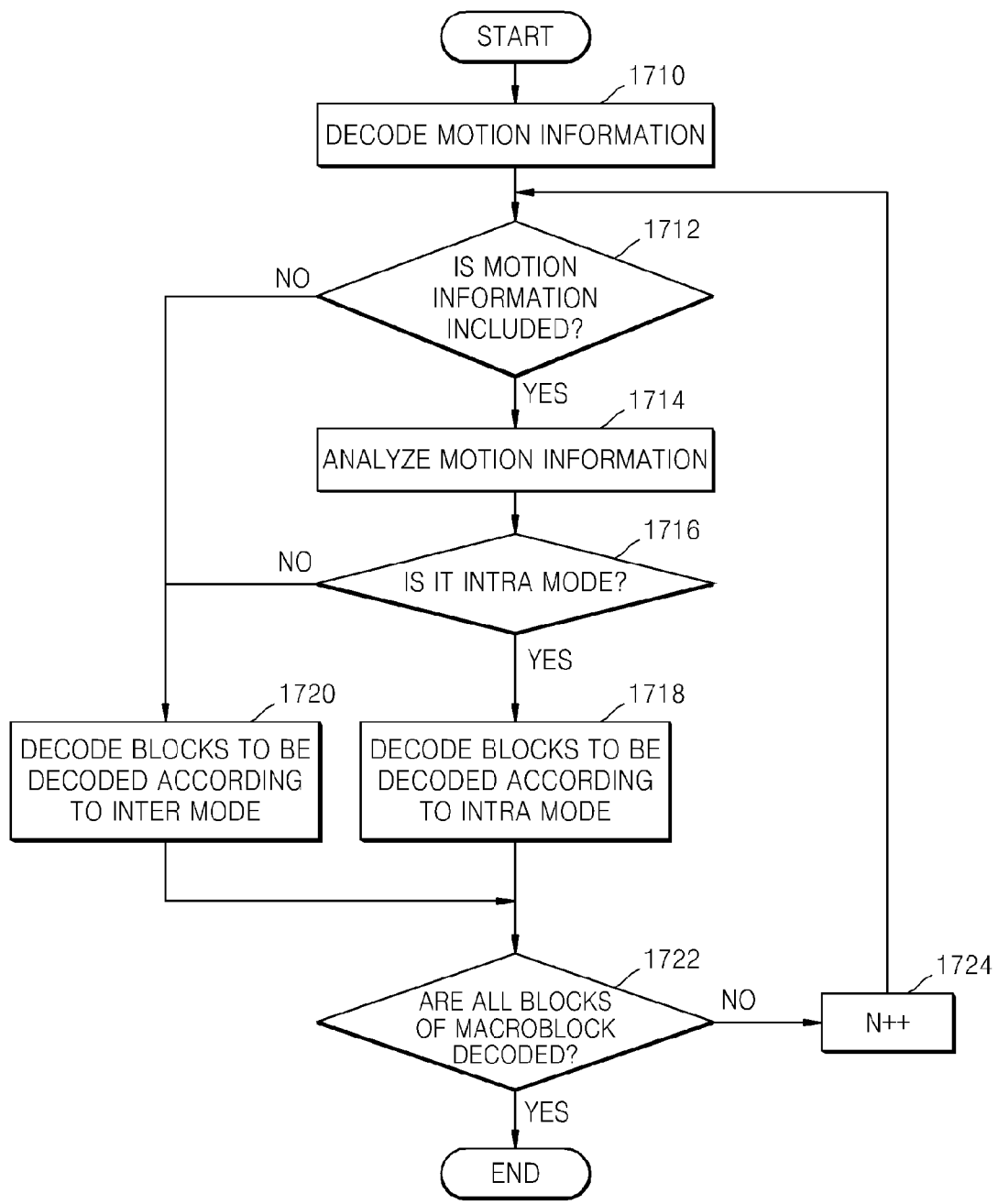
FIG. 17 is a flowchart illustrating an image decoding method according to another embodiment of the present invention.

FIG. 17 is a flowchart illustrating an image decoding method according to another embodiment of the present invention. Referring to FIG. 17, the image decoding method comprises operations 1710 through 1724 of decoding luma blocks according to a predetermined decoding mode of each luma block and decoding chroma blocks according to a predetermined decoding mode of each chroma block.

The third decoding unit 910 decodes MI (Operation 1710).

The first decoding unit 920 or the second decoding unit 930 determines whether MI on block that is to be decoded is included in the MI decoded in Operation 1710 (Operation 1712).

If the first decoding unit 920 or the second decoding unit 930 determines that the MI on the block that is to be decoded is included in the decoded MI, the first decoding unit 920 or the second decoding unit 930 analyzes the MI on the block that is to be decoded (Operation 1714).

The first decoding unit 920 or the second decoding unit 930 determines whether the MI analyzed in Operation 1714 is an intra mode (Operation 1716).

If the first decoding unit 920 or the second decoding unit 930 determines in Operation 1716 that the MI is the intra mode, the first decoding unit 920 or the second decoding unit 930 decodes the block that is to be decoded according to the intra mode (Operation 1718). To the contrary, if the first decoding unit 920 or the second decoding unit 930 determines in Operation 1716 that the MI is not an intra mode, the first decoding unit 920 or the second decoding unit 930 decodes the block that is to be decoded according to the inter mode (Operation 1720).

If the first decoding unit 920 or the second decoding unit 930 determines that the MI on block that is to be decoded is not included in the MI decoded in Operation 1710, the first decoding unit 920 or the second decoding unit 930 can perform Operation 1720 or decode the block that is to be decoded according to the intra mode.

Figure 18:
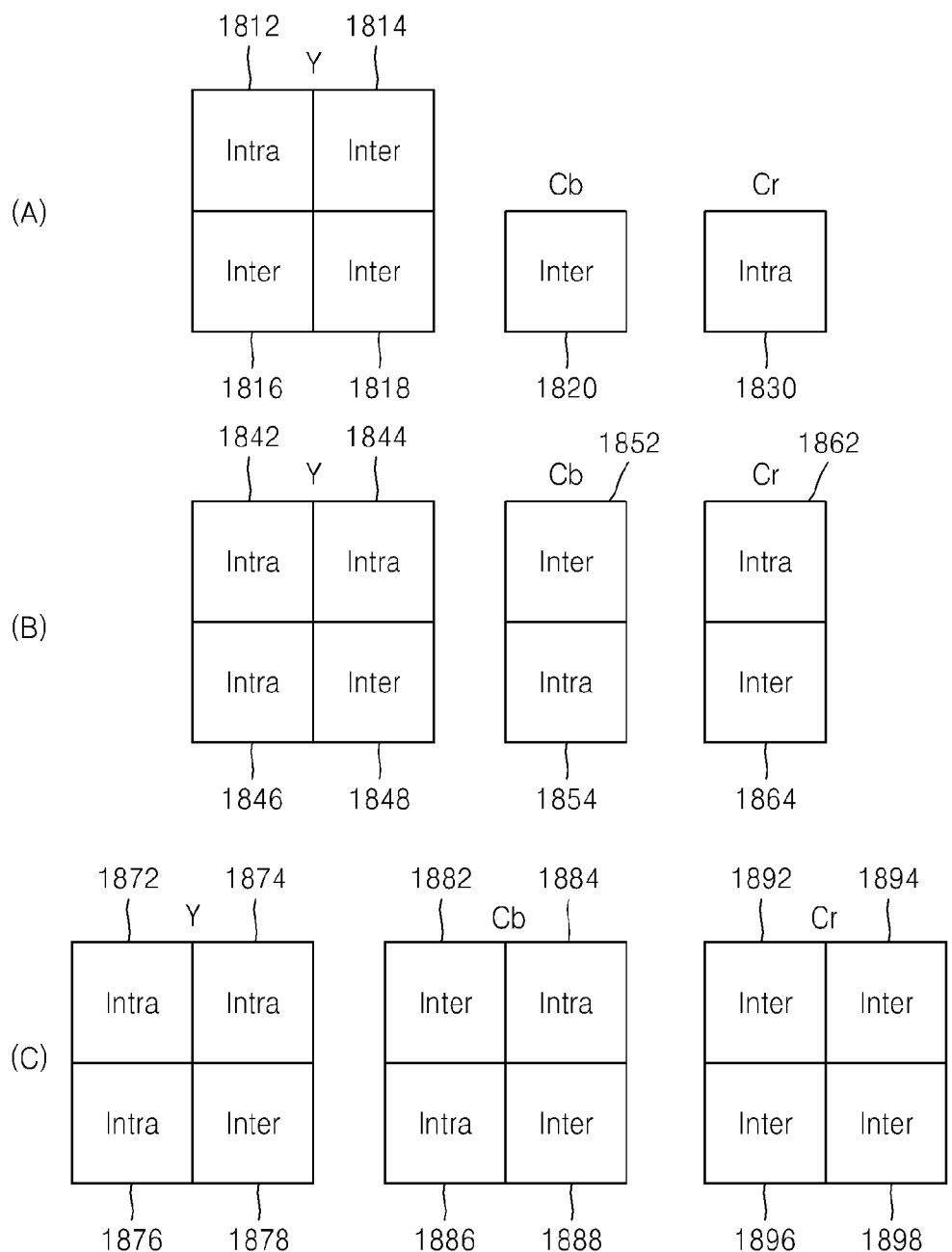
FIG. 18 (Parts (A), (B), and (C)) are diagrams for explaining the principle of encoding/decoding an image using a 4 MV according to another embodiment of the present invention.

FIGS. 18A, 18B, and 18C are diagrams for explaining the principle of encoding/decoding an image using a 4 MV according to another embodiment of the present invention.

Referring to FIG. 18A, a macroblock has a 4:2:0 image format. Luma blocks 1812, 1814, 1816, and 1818 are encoded/decoded according to an intra mode, an inter mode, an inter mode, and an inter mode, respectively. A blue chroma block 1820 is encoded/decoded according to the inter mode. A red chroma block 1830 is encoded/decoded according to the inter mode. Therefore, the encoding modes (or the decoding modes) of the luma blocks 1812, 1814, 1816, and 1818, the blue chroma block 1820, and the red chroma block 1830 cannot be related to each other.

Referring to FIG. 18B, a macroblock has a 4:2:2 image format. Luma blocks 1842, 1844, 1846, and 1848 are encoded/decoded according to an intra mode, an inter mode, an intra mode, and an inter mode, respectively. Blue chroma blocks 1852 and 1854 is encoded/decoded according to the inter mode and the intra mode, respectively. Red chroma blocks 1862 and 1864 are encoded/decoded according to the intra mode and the inter mode, respectively. Therefore, the encoding modes (or the decoding modes) of the luma blocks 1842, 1844, 1846, and 1848, the blue chroma blocks 1852 and 1854, and the red chroma blocks 1862 and 1864 cannot be related to each other.

Referring to FIG. 18C, a macroblock has a 4:4:4 image format. Luma blocks 1872, 1874, 1876, and 1878 are encoded/decoded according to an intra mode, an intra mode, an intra mode, and an inter mode, respectively. Blue chroma blocks 1882, 1884, 1886, and 1888 are encoded/decoded according to the inter mode, the intra mode, the intra mode, and the inter mode, respectively. Red chroma blocks 1892, 1894, 1896, and 1898 are encoded/decoded according to the inter mode. Therefore, the encoding modes (or the decoding modes) of the luma blocks 1842, 1844, 1846, and 1848, the blue chroma blocks 1852 and 1854, and the red chroma blocks 1862 and 1864 cannot be related to each other.

Figure 19:
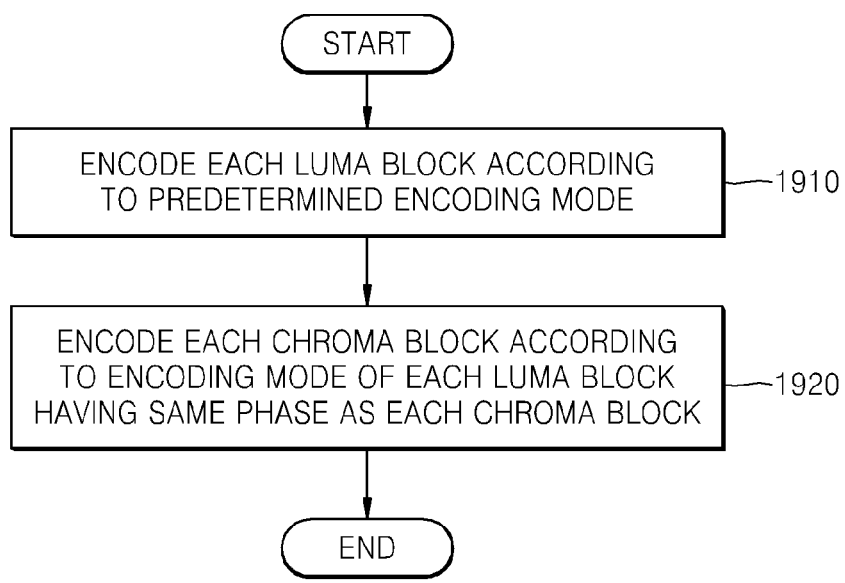
FIG. 19 is a flowchart illustrating an image encoding method according to another embodiment of the present invention.

FIG. 19 is a flowchart illustrating an image encoding method according to another embodiment of the present invention. Referring to FIG. 19, the image encoding method comprises Operations 1910 through 1920 of encoding luma blocks and then encoding chroma blocks according to encoding modes determined based on encoding modes of the luma blocks.

The first encoding unit 512 encodes each luma block according to a predetermined encoding mode (Operation 1910).

The second encoding unit 514 encodes each chroma block according to the encoding mode of each luma block having the same phase as each chroma block (Operations 1920).

Figure 20:
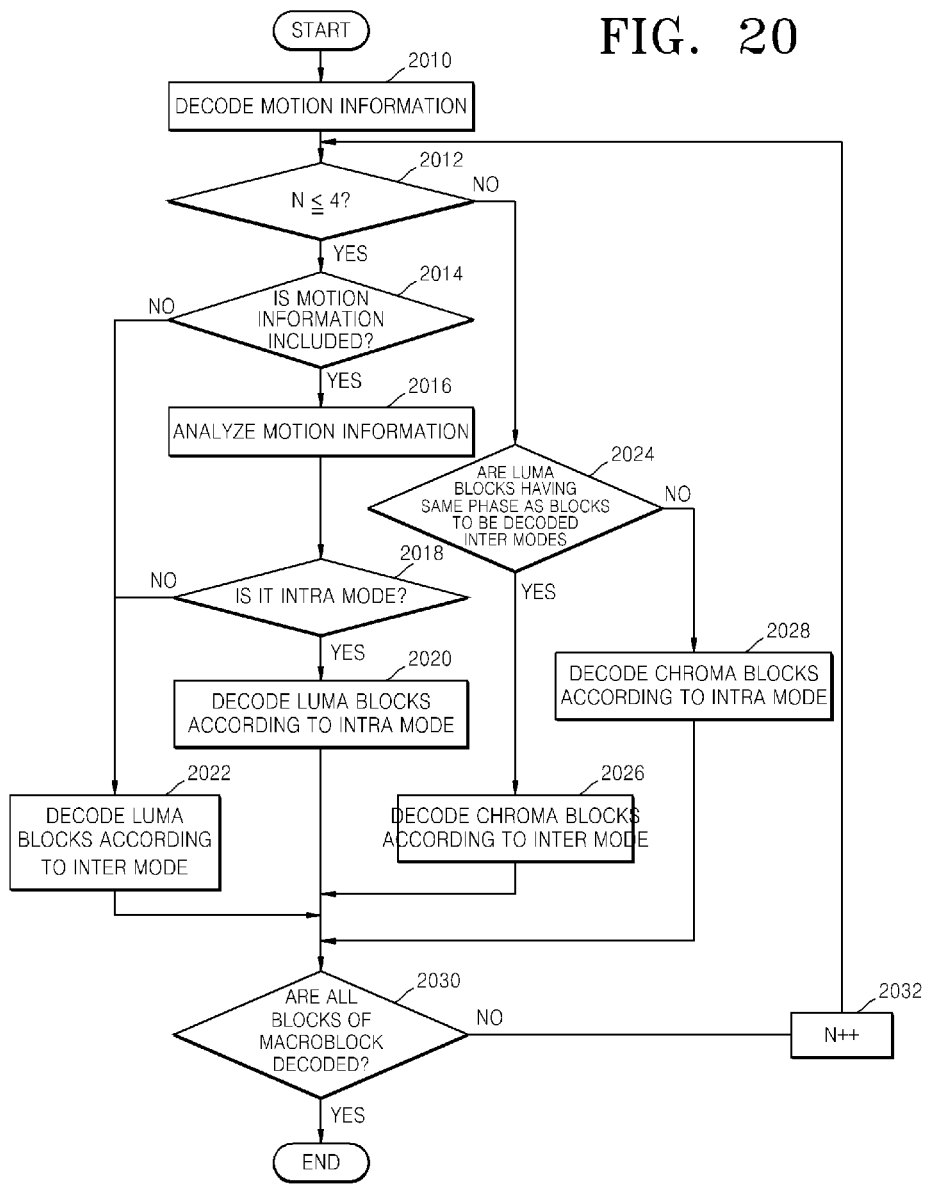
FIG. 20 is a flowchart illustrating an image decoding method according to another embodiment of the present invention.

FIG. 20 is a flowchart illustrating an image decoding method according to another embodiment of the present invention. Referring to FIG. 20, the image decoding method comprises Operations 2010 through 2032 of decoding luma blocks and then decoding chroma blocks according to decoding modes determined based on decoding modes of the luma blocks.

The third decoding unit 910 decodes MI (Operation 2010). The first decoding unit 920 determines whether block to be decoded is a luma block (Operation 2012).

N denotes a decoding priority and can be t, u, or v as described above.

If the first decoding unit 920 determines in Operation 2012 that the block to be decoded is the luma block, the first decoding unit 920 determines whether MI on the block that is to be decoded is included in the MI decoded in Operation 2010 (Operation 2014).

If the first decoding unit 920 determines in Operation 2014 that the MI on the blocks that are to be decoded is included in the decoded MI, the first decoding unit 920 analyzes the MI on the blocks that are to be decoded (Operation 2016).

The first decoding unit 920 determines whether the MI analyzed in Operation 2016 is an intra mode (Operation 2018).

If the first decoding unit 920 determines in Operation 2018 that the MI is the intra mode, the first decoding unit 920 decodes the block that is to be decoded according to the intra mode (Operation 2020). To the contrary, if the first decoding unit 920 determines in Operation 2018 that the MI is not an intra mode, the first decoding unit 920 decodes the block that is to be decoded according to the inter mode (Operation 2022).

If the first decoding unit 920 determines in Operation 2014 that the MI on the block to be decoded is not included in the decoded MI, the first decoding unit 920 performs Operation 2022 or can decode the block that is to be decoded according to the inter mode, although this case is not shown.

If the first decoding unit 920 determines in Operation 2012 that the block to be decoded are a chroma block, the second decoding unit 930 determines whether the decoding mode of the luma blocks having the same phase as the block that is to be decoded is the inter mode or intra mode (Operation 2024).

If the second decoding unit 930 determines in Operation 2024 that the decoding mode of the luma blocks having the same phase as the block that is to be decoded is the inter mode, the second decoding unit 930 decodes the block that is to be decoded according to the inter mode (Operation 2026). To the contrary, if the second decoding unit 930 determines in Operation 2024 that the decoding mode of the luma blocks having the same phase as the block that is to be decoded is the intra mode, the second decoding unit 930 decodes the block to be decoded according to the intra mode (Operation 2028).

After Operations 2020, 2022, 2026 or 2028 are performed, it is determined whether all the blocks of the macroblock are decoded (Operation 2030). If it is determined in Operation 2030 that the macroblock has undecoded blocks, a next block that is to be next-decoded in Operations 2032 and 2012.

Figure 21:
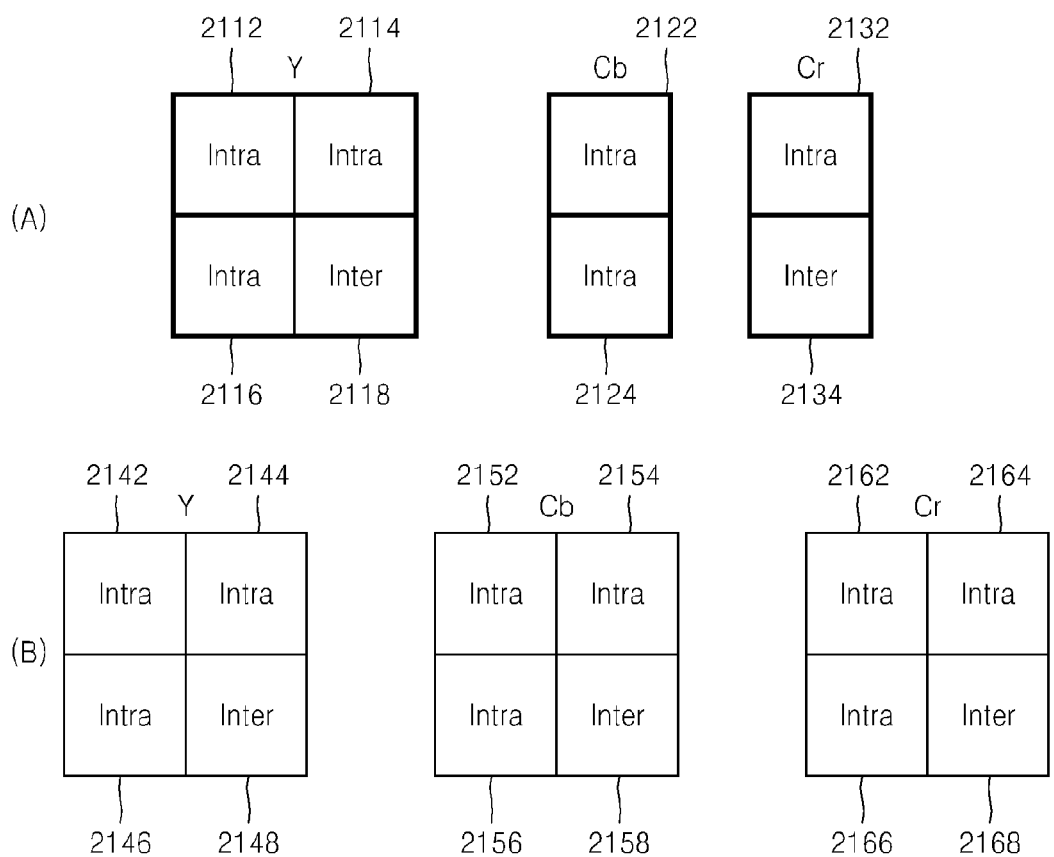
FIG. 21 (Parts (A) and (B)) are diagrams for explaining the principle of encoding/decoding an image using a 4 MV according to another embodiment of the present invention.

FIGS. 21A and 22B are diagrams for explaining the principle of encoding/decoding an image using a 4 MV according to another embodiment of the present invention.

Referring to FIG. 21A, a macroblock has a 4:2:2 image format. A phase of one of luma blocks 2112, 2114, 2116, and 2118 indicates a position of one of the luma blocks 2112, 2114, 2116, and 2118 in the luma blocks 2112, 2114, 2116, and 2118. A phase of one of blue chroma blocks 2122 and 2124 indicates a position of one of the blue chroma blocks 2122 and 2124 in blue chroma blocks 2122, 2124, 2132, and 2134. A phase of one of red chroma blocks 2132 and 2134 indicates a position of one of the red chroma blocks 2132 and 2134 in the red chroma blocks 2122, 2124, 2132, and 2134.

The luma blocks 2112, 2114, 2116, and 2118 are encoded/decoded according to an intra mode, an intra mode, an intra mode, and an inter mode, respectively.

Therefore, the blue chroma block 2122 is encoded/decoded according to the encoding mode (or the decoding mode) of the luma block 2112, the blue chroma block 2124 is encoded/decoded according to the encoding mode (or the decoding mode) of the luma block 2116, the red chroma block 2132 is encoded/decoded according to the encoding mode (or the decoding mode) of the luma block 2114, and the red chroma block 2134 is encoded/decoded according to the encoding mode (or the decoding mode) of the luma block 2118.

Referring to FIG. 21B, a macroblock has a 4:4:4 image format. A phase of one of luma blocks 2142, 2144, 2146, and 2148 indicates a position of one of the luma blocks 2142, 2144, 2146, and 2148 in the luma blocks 2142, 2144, 2146, and 2148. A phase of one of blue chroma blocks 2152, 2154, 2156, and 2158 indicates a position of one of the blue chroma blocks 2152, 2154, 2156, and 2158 in the blue chroma blocks 2152, 2154, 2156, and 2158. A phase of one of red chroma blocks 2162, 2164, 2166, and 2168 indicates a position of one of the red chroma blocks 2162, 2164, 2166, and 2168 in the red chroma blocks 2162, 2164, 2166, and 2168.

The luma blocks 2142, 2144, 2146, and 2148 are encoded/decoded according to an intra mode, an intra mode, an intra mode, and an inter mode, respectively.

Therefore, the blue chroma block 2152 is encoded/decoded according to the encoding mode (or the decoding mode) of the luma block 2142, the blue chroma block 2154 is encoded/decoded according to the encoding mode (or the decoding mode) of the luma block 2144, the blue chroma block 2156 is encoded/decoded according to the encoding mode (or the decoding mode) of the luma block 2146, and the blue chroma block 2158 is encoded/decoded according to the encoding mode (or the decoding mode) of the luma block 2148.

Similarly, the red chroma block 2162 is encoded/decoded according to the encoding mode (or the decoding mode) of the luma block 2142, and the red chroma block 2164 is encoded/decoded according to the encoding mode (or the decoding mode) of the luma block 2144, the red chroma block 2166 is encoded/decoded according to the encoding mode (or the decoding mode) of the luma block 2146, and the red chroma block 2168 is encoded/decoded according to the encoding mode (or the decoding mode) of the luma block 2148.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed network coupled computer systems so that the computer readable code is stored and executed in a distributed fashion.

According to the image encoding method and apparatus of the present invention, an encoding unit that encodes an image using a 4 MV encodes chroma blocks according to encoding modes determined based on a predetermined encoding mode of each luma block. Similarly, according to the image decoding method and apparatus of the present invention, a decoding unit that decodes an image using a 4 MV decodes chroma blocks according to decoding modes determined based on a predetermined decoding mode of each luma block.

According to the method and apparatus for encoding an image of the present invention, an encoding unit that encodes an image using a 4 MV encodes luma blocks according to encoding modes determined based on a predetermined encoding mode of each luma block, and encodes chroma blocks according to encoding modes determined based on a predetermined encoding mode of each chroma block. Similarly, according to the method and apparatus for decoding an image of the present invention, a decoding unit that decodes an image using a 4 MV decodes luma blocks according to decoding modes determined based on a predetermined decoding mode of each luma block, and decodes chroma blocks according to decoding modes determined based on a predetermined decoding mode of each chroma block.

The method and apparatus for encoding and decoding an image of the present invention provides a variety of methods of determining encoding modes (or decoding modes) when an image that is to be compressed (or that is to be restored) is expressed as a luma component and a chroma component.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image decoding method comprising:
   entropy-decoding a bitstream;
   decoding, by performed using at least one processing device, entropy-decoded luma blocks according to a luma decoding mode of each entropy-decoded luma block, to generate restored luma blocks; and
   decoding entropy-decoded chroma blocks by using one of chroma decoding modes dependent on the luma decoding mode of each entropy-decoded luma block, to generate restored chroma blocks,
   wherein one of the chroma decoding modes is identical to the luma decoding mode of each entropy-decoded luma block.

2. The image decoding method of claim 1, wherein, in the decoding of chroma blocks, the decoding modes are determined by using the luma decoding mode of each luma block.

3. The image decoding method of claim 1, wherein, in the decoding of chroma blocks, the chroma blocks are decoded according to a majority of luma decoding modes of the luma blocks.

4. The image decoding method of claim 3, wherein the luma blocks and the chroma blocks have one of a 4:2:0 image format, a 4:2:2 image format, and a 4:4:4 image format.

5. The image decoding method of claim 1, wherein, in the decoding of chroma blocks, the chroma block is decoded according to the luma decoding mode of the luma block having the same phase as the chroma block.

6. The image decoding method of claim 5, wherein the luma blocks and the chroma blocks have one of the 4:2:2 image format and the 4:4:4 image format.

7. The image decoding method of claim 1, wherein the decoding of chroma blocks comprises:
   determining whether given motion information (MI) indicates a luma decoding mode of the luma block to be decoded; and
   if it is determined that the MI indicates the luma decoding mode of the luma block to be decoded, decoding the luma block to be decoded according to the luma decoding mode represented in the MI.

8. The image decoding method of claim 7, wherein if it is determined that the MI does not indicate the luma decoding mode of the luma block to be decoded, the decoding of luma blocks further comprises:
   decoding the luma block to be decoded according to a constant decoding mode.

9. The image decoding method of claim 1, wherein the decoding of chroma blocks comprises:
   determining whether given motion information (MI) indicates a chroma decoding mode of the chroma block to be decoded; and
   if it is determined that the MI indicates the chroma decoding mode of the chroma block to be decoded, decoding the chroma block to be decoded according to the chroma decoding mode represented in the MI.

10. The image decoding method of claim 9, wherein if it is determined that the MI does not indicate the chroma decoding mode of the chroma block to be decoded, the decoding of chroma blocks further comprises:
   decoding the chroma block to be decoded according to a constant decoding mode.

* * * * *